United States Patent [19]

Ike et al.

[11] 4,318,146
[45] Mar. 2, 1982

[54] ROTARY HEAD ASSEMBLY

[75] Inventors: Kazuo Ike, Kamakura; Katsuichi Tachi, Kawasaki; Tetsuro Kato, Tokyo, all of Japan

[73] Assignee: Sony Corporation, Tokyo, Japan

[21] Appl. No.: 107,837

[22] Filed: Dec. 28, 1979

[30] Foreign Application Priority Data

Dec. 29, 1978 [JP] Japan .................. 53-162266

[51] Int. Cl.³ .................. G11B 21/18; G11B 5/52; G11B 5/027; G11B 5/25
[52] U.S. Cl. .................. 360/107; 360/21; 360/84; 360/119
[58] Field of Search ............ 360/21, 107, 104, 84, 360/85, 119

[56] References Cited

U.S. PATENT DOCUMENTS 3,721,773 3/1973 Kluge .................. 360/107
4,040,109 8/1977 Kryltsov .................. 360/107
4,165,523 8/1979 Hathaway .................. 360/107
4,199,793 4/1980 Baldwin .................. 360/84

FOREIGN PATENT DOCUMENTS 2814082 10/1978 Fed. Rep. of Germany ........ 360/21
52-40112 3/1977 Japan .................. 360/21
7801929 8/1978 Netherlands .................. 360/21

Primary Examiner—Robert S. Tupper
Attorney, Agent, or Firm—Hill, Van Santen, Steadman, Chiara & Simpson

[57] ABSTRACT

A multi-channel recording and/or reproducing apparatus is disclosed, wherein a plurality of rotary magnetic heads scan a magnetic tape to form a plurality of skewed parallel tracks simultaneously. These heads are aligned substantially in the scanning direction on a single head base plate. Preferably, these heads are so secured as to form parallel skewed tracks without guardbands therebetween. Each head has the same thickness, and is mounted on a head base. Even though the thickness of each head chip is the same, effective head gaps are formed to have different heights individually from the surface of the head base plate. When forming guardband-less plural tracks, an azimuth recording technique is introduced in order to avoid crosstalk between adjacent channels during reproduction.

4 Claims, 9 Drawing Figures

ROTARY HEAD ASSEMBLY

BACKGROUND OF THE INVENTION

1. Field of the Invention

This invention relates to a rotary head assembly for use in a multihead tape recording apparatus, and more particularly to such an assembly that supports a plurality of magnetic heads aligned substantially in a head scanning direction.

2. Description of the Prior Art

It is a recent trend that high-density recording technique is required, particularly for recording analog signals by digitalization or for manufacturing recorders of smaller dimensions.

One of the methods to perform such high density recording is carried out by adopting a rotary head system employed presently in manufacture of video tape recorders, which are generally classified into one-head type, two-head 180° wrap type and four-head type. Another technique relating thereto is termed multitrack recording which divides an input signal into a plurality of channels and records the same in a plurality of tracks simultaneously. This method is adopted in manufacture of fixed head type PCM (pulse code modulation) audio recorders. Moreover, the above two techniques may be combined for producing multitrack rotary scan type recorders. However, the problem arising in this resides in the structure of a rotary scan type multihead assembly. Since the width of each track becomes even less than 30 microns to achieve high density recording, extremely great difficulties are unavoidable in aligning such thin heads.

According to one conventional art, a head base plate is provided for each of head chips and, when mounting the base plate, a spacer is inserted to adjust the height of each effective head gap. This method, however, has some disadvantages including increase in the number of component elements and also troublesome adjustment. Furthermore, it has been impossible heretofore to dispose the individual heads in the immediate proximity of each other.

SUMMARY OF THE INVENTION

The principal object of the present invention is to provide a novel head assembly for use in a rotary scan type multitrack recording apparatus, wherein a plurality of magnetic heads are mounted on a single head base plate in a multihead scan system.

In the present invention, a plurality of head chips or pieces are aligned substantially in a head scanning direction. Although all head chips have the same thickness, the heights of the effective gaps thereof are rendered different individually from one another by cutting the head chips in a predetermined manner.

In case a further higher density is desired in recording, the heights of the effective gaps may be so selected as not to form a guard band between tracks. For the purpose of preventing crosstalk during reproduction, it is necessary for the heads to have different gap angles in forming adjacent tracks on a magnetic tape. This type of recording method is called "azimuth recording". The crosstalk between adjacent tracks is avoided by azimuth loss of recording principle.

Preferably, the head base plate is mounted on an upper rotary drum around which a magnetic recording tape wraps and is moved. On the periphery of the upper rotary drum, there is formed a head window through which the plural heads contact and scan the magnetic tape to form a plurality of parallel tracks substantially at the same time.

DESCRIPTION OF THE PREFERRED EMBODIMENTS

Figure 1:
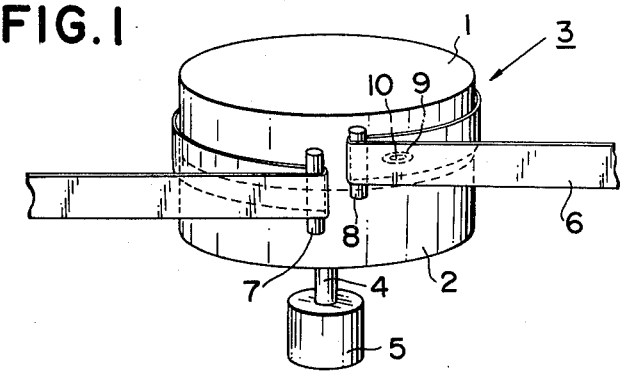
FIG. 1 is a schematic perspective view of a rotary drum device in which a magnetic head assembly is incorporated.
Figure 2:
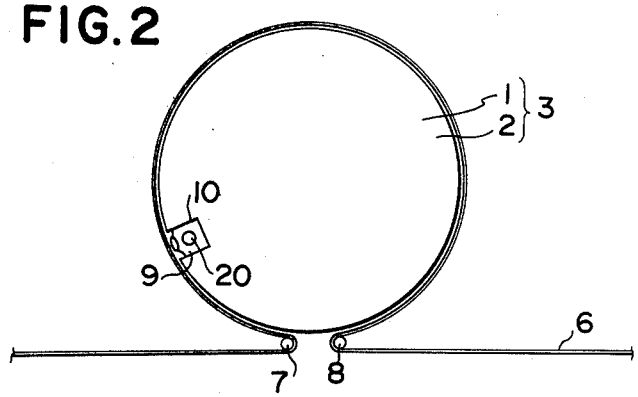
FIG. 2 is a schematic plan view showing the state where a magnetic tape is wound around the rotary drum device.
Figure 3:
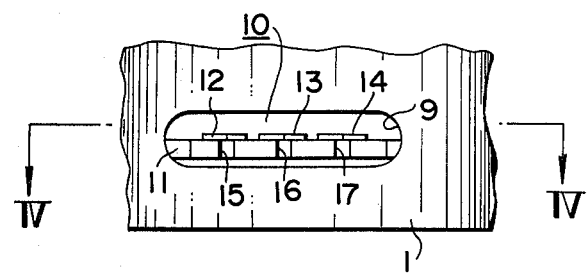
FIG. 3 is an enlarged front view of a principal part of the rotary drum device in which a magnetic head assembly of this invention is employed.
Figure 4:
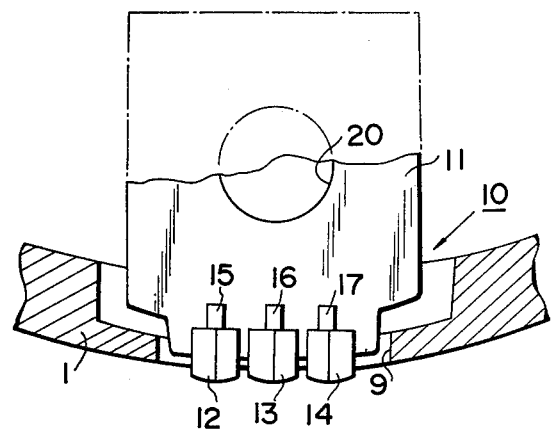
FIG. 4 is a sectional plan view taken along the line IV—IV in FIG. 3.

A recording and/or reproducing apparatus equipped with a rotary head assembly of the present invention has a structure such as that shown in FIGS. 1 and 2, in which a rotary upper drum 1 and a stationary lower drum 2 constitute a tape guide system 3. The rotary upper drum 1 is rotated by a motor 5 through a shaft 4. During recording and/or playback of television signals in NTSC system, for example, the upper drum 1 is driven preferably at a speed of 60 r.p.s. Meanwhile, a magnetic tape 6 is guided by a pair of guide pins 7 and 8 as illustrated in FIG. 1 and is thereby wound around the periphery of the tape guide system 3 substantially over 350°. The rotary upper drum 1 has a head window 9, from which a plurality of magnetic heads of a head assembly 10 protrude to scan the magnetic tape 6. The head assembly 10 includes a head base plate 11 and a plurality of magnetic head chips 12, 13 and 14, as shown in FIGS. 3 and 4. The head base plate 11 has a screw hole 20 and is secured on the rotary upper drum 1 by means of a screw (not shown).

As shown in FIGS. 3 and 4, the head base plate 11 has a plurality of slits 15, 16 and 17. These slits are provided for winding coils for each head.

Figure 5:
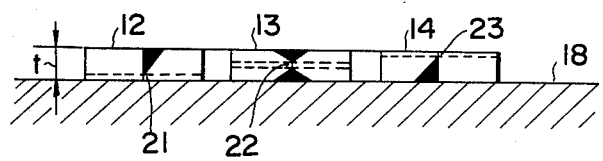
FIG. 5 is an enlarged front view of head chips in one embodiment of the magnetic head assembly according to this invention.
Figure 6:
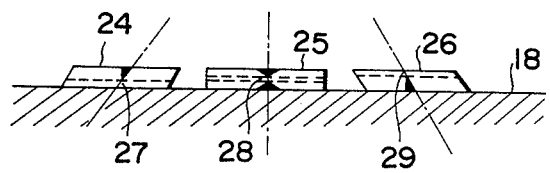
FIG. 6 is an enlarged front view of head chips in another embodiment different from FIG. 5.

FIGS. 5 and 6 illustrate the surface of the head base plate 11 with the position and angle of the effective gap in each head, wherein a reference numeral 18 denotes the top surface of the head base plate 11. As shown in FIG. 5, the heads respectively have effective gaps 21, 22 and 23 at individually different heights from the top surface 18. In the example of FIG. 5, the width and height of each head gap is so selected as to form a guard band between recorded tracks. The thickness t is the same in all heads, but the effective gaps thereof are rendered different from one another by proper cutting of the head chips.

The example of FIG. 6 is suited particularly for a higher-density recording operation, wherein guard-band-less recording is performed. In this example, the effective gaps 27, 28 and 29 have individually different angles against the top surface 18, as represented by one-dot chain lines. In this structure, occurrence of crosstalk between adjacent heads is avoidable by the azimuth loss. As in the foregoing case, the entire heads 24, 25 and 26 in the example of FIG. 6 also have the same thickness.

Figure 7:
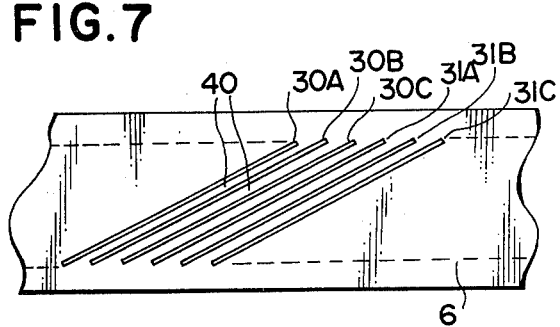
FIG. 7 is a partially cutaway plan view of a magnetic tape illustrating an exemplary track pattern formed by the head assembly of this invention.
Figure 8:
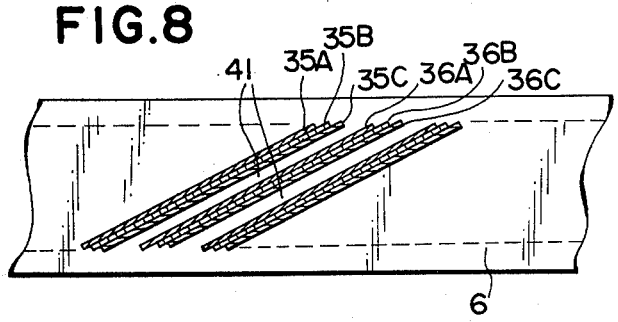
FIG. 8 is a partially cutaway plan view of a magnetic tape illustrating another track pattern different from FIG. 7.
Figure 9:
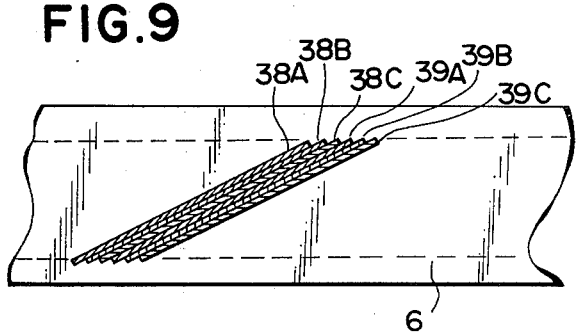
FIG. 9 is a partially cutaway plan view of a magnetic tape illustrating another example of track pattern different from FIGS. 7 and 8.

FIGS. 7 through 9 illustrate track patterns formed by using the rotary head assembly of this invention.

FIG. 7 shows one example of a recording pattern obtained when the embodiment of FIG. 5 is applied. In this figure, as described before, a plurality of tracks 30A, 30B and 30C are respectively separated by guard bands 40. These tracks 30A, 30B and 30C are formed substantially at the same time by one rotation of the upper rotary drum 1, and the succeeding rotation of the drum 1 forms another triad of parallel tracks 31A, 31B and 31C.

FIGS. 8 and 9 illustrate recording patterns obtained when the embodiment of FIG. 6 is applied. In the example of FIG. 8, tracks 35A, 35B and 35C are formed by one rotation of the upper rotary drum 1, and there exists no guard band area between tracks. Another rotation of the drum 1 forms tracks 36A, 36B and 36C. In the case of FIG. 8, there is formed a guard band 41 between triads of tracks.

In the example of FIG. 9, guardband-less recording is performed completely. Tracks 38A, 38B and 38C are formed by one rotation of the upper drum 1, and the succeeding rotation thereof forms another triad of tracks 39A, 39B and 39C.

In the above embodiments, the explanation has been given merely on a three-channel system alone. However, the present invention is of course, applicable to a two-channel system and a four-channel system as well. For instance, in the latter system, four head chips are aligned in a head scanning direction. And in this case also, four heads are mounted on a single head base plate as in the foregoing examples.

It is to be understood that a variety of modifications may be effected in this invention without departing from the spirit and scope thereof.

We claim as our invention:

1. A rotary head assembly having a plurality of magnetic heads for scanning magnetic tape comprising; a tape guide member for guiding a magnetic tape on the periphery thereof, a rotary member for carrying said plurality of magnetic heads and carrying a planar head base plate with a flat supporting surface, said plurality of magnetic heads mounted side by side on said supporting surface of said head base for scanning said tape, all of said plurality of heads having the same thickness, portions of the transducing gap of each of said plurality of heads removed to form effective magnetic gaps spaced different distances from said supporting surface so that each of said magnetic heads scan a different portion of said tape.

2. A rotary head assembly according to claim 1 wherein said portions removed from said gaps are V-shaped.

3. A rotary head assembly according to claim 1 wherein said gaps spaced from said supporting surface so that tracks on said tape scanned by said plurality of heads are closely spaced from each other.

4. A rotary head assembly according to claim 1 wherein said gaps spaced from said supporting surface so that tracks on said tape scanned by said plurality of heads are spaced apart to form guard bands therebetween.

* * * * *